(12) United States Patent
Chen et al.

(10) Patent No.: US 8,220,997 B2
(45) Date of Patent: Jul. 17, 2012

(54) CIRCULATING SYSTEM FOR A LINEAR GUIDEWAY

(75) Inventors: Tsung-Jen Chen, Taichung (TW);
Che-Hsuan Yu, Taichung (TW);
Hsin-Ping Liu, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 477 days.

(21) Appl. No.: 12/535,002

(22) Filed: Aug. 4, 2009

(65) Prior Publication Data

US 2011/0033141 A1 Feb. 10, 2011

(51) Int. Cl.
*F16C 29/06* (2006.01)

(52) U.S. Cl. .......................................................... 384/45

(58) Field of Classification Search .................... 384/43, 384/44, 45
See application file for complete search history.

(56) References Cited

U.S. PATENT DOCUMENTS

| 4,420,193 A | * | 12/1983 | Teramachi | 384/45 |
| 4,478,462 A | * | 10/1984 | Teramachi | 384/45 |
| 4,662,763 A | * | 5/1987 | Itoh | 384/45 |
| 4,869,600 A |   | 9/1989 | Tonogai | |
| 5,102,235 A |   | 4/1992 | Mugglestone | |
| 5,281,030 A | * | 1/1994 | Krnac | 384/44 |
| 5,911,509 A |   | 6/1999 | Kawaguchi et al. | |
| 7,604,408 B2 | * | 10/2009 | Dorn et al. | 384/45 |
| 2002/0021847 A1 | * | 2/2002 | Wu | 384/45 |
| 2009/0196539 A1 | * | 8/2009 | Pfeuffer et al. | 384/45 |

FOREIGN PATENT DOCUMENTS

| JP | 06002714 A | * | 1/1994 |
| WO | WO 2005019667 A1 | * | 3/2005 |

* cited by examiner

*Primary Examiner* — Thomas R Hannon
*Assistant Examiner* — Phillip A Johnson

(57) ABSTRACT

A circulating system for a linear guideway comprises a slide block, a slide rail, two cover plates, two end caps and plural rolling elements. The slide block is disposed on the slide rail. The two cover plates and the two end caps are disposed at two opposite ends of the slide block, respectively. Between the two cover plates and the two end caps are disposed inner return and outer return blocks, respectively, and the inner return and the outer return blocks each are defined with half rolling paths to form complete rolling paths. Both ends of a complete rolling path and both ends of a complete loaded path are connected to both ends of two complete return paths to complete circulation paths. The inner and outer return blocks are made by common plastic injection molding, and the formed rolling paths are made of plastic material.

11 Claims, 16 Drawing Sheets

B-B

C-C

D-D

US 8,220,997 B2

CIRCULATING SYSTEM FOR A LINEAR GUIDEWAY

BACKGROUND OF THE INVENTION

1. Field of the Invention

The present invention relates to a circulating system for a linear guideway; and more particularly to a circulating system for a linear guideway in which cover plates and end caps are improved.

2. Description of the Prior Art

Conventionally, in order to reduce friction coefficient of the slide block and noise caused by movement of the slide block, between the slide block and the slide rail is normally provided a circulating system for balls to roll therein. The circulating system includes two end caps at both ends of the slide block, plural loaded paths between the slide block and the slide rail, and plural non-loaded paths passing through the slide block. Furthermore, the respective end caps are defined with a return path for connecting the loaded paths to the respective non-loaded paths to form a complete circulation path. Since the slide block and the rail are load-carrying structures, they are both made of metal.

The existing circulation paths for a linear guideway can generally be divided into three categories:

As shown in FIG. 15, U.S. Pat. No. 5,911,509 discloses that return paths and rolling paths for the circulation path are formed by insert injection molding, on the slide block 61 is directly integrally formed rolling paths 62 by a injection molding machine in the injection mold, and then end caps with return paths will be combined to two opposite ends of the slide block 61. This structure design suffers from the following defects: since every metal-made slide block 61 needs to be embedded in a mold to perform the injection molding operation, the machining accuracy of the slide block 61 must be improved to match the mold, or else the plastic or rubber material is prone to overflowing since the mold is not closed tightly, or the mold is prone to colliding with the slide block 61, thus causing damage to the mold. In addition, the machining accuracy of the slide block 61 is in connection with the machining cost of the slide block 61, that is, the higher the machining accuracy of the slide block 61 is, the higher the machining cost of the slide block 61 will be.

As shown in FIG. 16, U.S. Pat. No. 5,102,235 discloses that the rolling path is formed in such a method that the two end caps 71 each are provided with a rolling portion 711, and then the end caps 71 are combined to both ends of the slide block 72, the rolling portions 711 each are defined with a first half rolling path 712, and the slide block 72 is directly defined with a second half rolling path 721 at each of two opposite outer sides of a bottom thereof, the second half rolling paths 721 cooperate with the respective half rolling paths 712 to define a complete rolling path which cooperates with the return paths in the end caps 71 and the loaded paths between the slide rail 73 and the end caps 71 to form a complete circulation path. This structure design suffers form the following defects: one of the half rolling paths 721 is directly machined in the outer side of the bottom of the metal slide block 72, so that half of the rolling path is made of metal, when the rolling elements roll along the rolling path in a non-loaded manner, the rolling elements are prone to colliding with the metal-made half rolling paths 721 to make noise, in addition, since one of the half rolling paths 721 is directly machined in the metal-made slide block 72, the half rolling path 721 of the metal-made slide block 72 must be machined to have a certain fineness to enable the rolling elements to roll smoothly, thus still suffering from the defect of high cost.

As shown in FIG. 17, U.S. Pat. No. 4,869,600 discloses that the slide block 81 is provided at each of two opposite undersides thereof with an upper rolling member 82 and a lower rolling member 83 which are stacked on top of each other and combined to the end caps 84 at both ends of the slide block 81. The metal-made slide block 81 is machined to form a first half rolling path 811 at each of two opposite lower lateral edges thereof, and the upper rolling members 82 each are formed with a first half rolling path 821 at an upper side thereof, and a second half rolling path 822 at a lower side thereof, and the lower rolling members 83 each are formed with a second half rolling path 831 at an upper side thereof, so that two complete first rolling paths and two complete second rolling paths can be formed for two groups of rolling elements to roll therein. This structure design suffers from the following defects: since the first half rolling paths 811 are directly machined in the metal-made slide block 81, the metal-made rolling elements are prone to colliding with the first half rolling paths 811 to make noise, and the first rolling paths and the second rolling paths are complicated in structure, since they must be additionally provided with two upper rolling members 82 and two lower rolling members 83, and at least four locking screws 85 to fix the first and the upper and the lower rolling members 82, 83.

The present invention has arisen to mitigate and/or obviate the afore-described disadvantages.

SUMMARY OF THE INVENTION

The technical problems to be solved:

In the existing circulating systems for a linear guideway, the non-loaded rolling paths are mostly made of metal combined with plastic material which will produce a loud noise when in use, however, although the non-loaded rolling paths are made by insert injection molding to solve the problem of noise, the machining accuracy is correspondingly increased, thus suffering from the defect of high cost.

The technical features for solving the above technical problems:

In order to solve the above technical problems, the present invention provides a circulating system for a linear guideway comprising a slide rail, a slide block, two cover plates, two end caps and plural rolling elements. The slide rail is defined with at least one rail groove at each of two opposite sides thereof. The slide block is provided with an assembling portion at each of two opposite outer sides of a bottom thereof and slidably mounted on the slide rail. The slide block is further defined with at least one block groove at each of two opposite sides thereof. The rail grooves cooperate with the block grooves to form plural complete loaded paths. The two cover plates are disposed at the opposite ends of the slide block, respectively. Each of the two cover plates includes an inner end surface and an outer end surface and is provided with at least one first return path at each of two opposite sides of the outer end surface thereof. Between the two cover plates are provided inner return blocks extending along the corresponding first return paths. The inner return blocks of the two cover plate are disposed in the respective assembling portions. Each of the inner return blocks is defined with a half rolling path connected to the corresponding first return path. The two end caps include an inner end surface and an outer end surface. The two end caps are disposed opposite each other in such a manner that the inner end surfaces of the two end caps abut against the outer end surfaces of the two cover plates, respectively. The inner end surface of each of the end caps is defined with at lest one second return path at each of two opposite sides thereof. The second return paths of the end caps cooperate with the first return paths of the cover plates to form plural complete return paths. Between the two end caps are provided outer return blocks extending from the second return paths. The outer return blocks of the two end caps are disposed in the assembling portions. Each of the outer return blocks is defined with a half rolling path connected to the corresponding second return path in such a manner that the half rolling paths located at both outer sides of the slide block can form plural rolling paths in the assembling portions. Both ends of the respective complete rolling paths and both ends of the respective complete loaded paths are connected to both ends of the respective complete return paths in such a manner one of the complete rolling paths, one of the complete loaded paths and the two complete return paths form a circulation path. The plural rolling elements are disposed in the respective circulation paths for circulating therein.

The present invention has the following advantages:

The primary objective of the present invention is to provide a circulating system for a linear guideway which can reduce the machining cost and facilitate quick mass production by utilizing a common plastic injection molding method to make the cover plates and the end caps.

The secondary objective of the present invention is to provide a circulating system for a linear guideway which can reduce noise by combining cover plates and end caps to make the inner return blocks and the outer return blocks between the cover plates and the end caps form plural complete rolling paths which are made of plastic material and can avoid the noise caused by collision between metals when the rolling elements roll therein.

The third objective of the present invention is to provide a circulating system for a linear guideway which can reduce the machining cost of the slide block by making the rolling paths with plastic material to reduce the machining accuracy of the slide block.

DETAILED DESCRIPTION OF THE PREFERRED EMBODIMENTS

Figure 1:
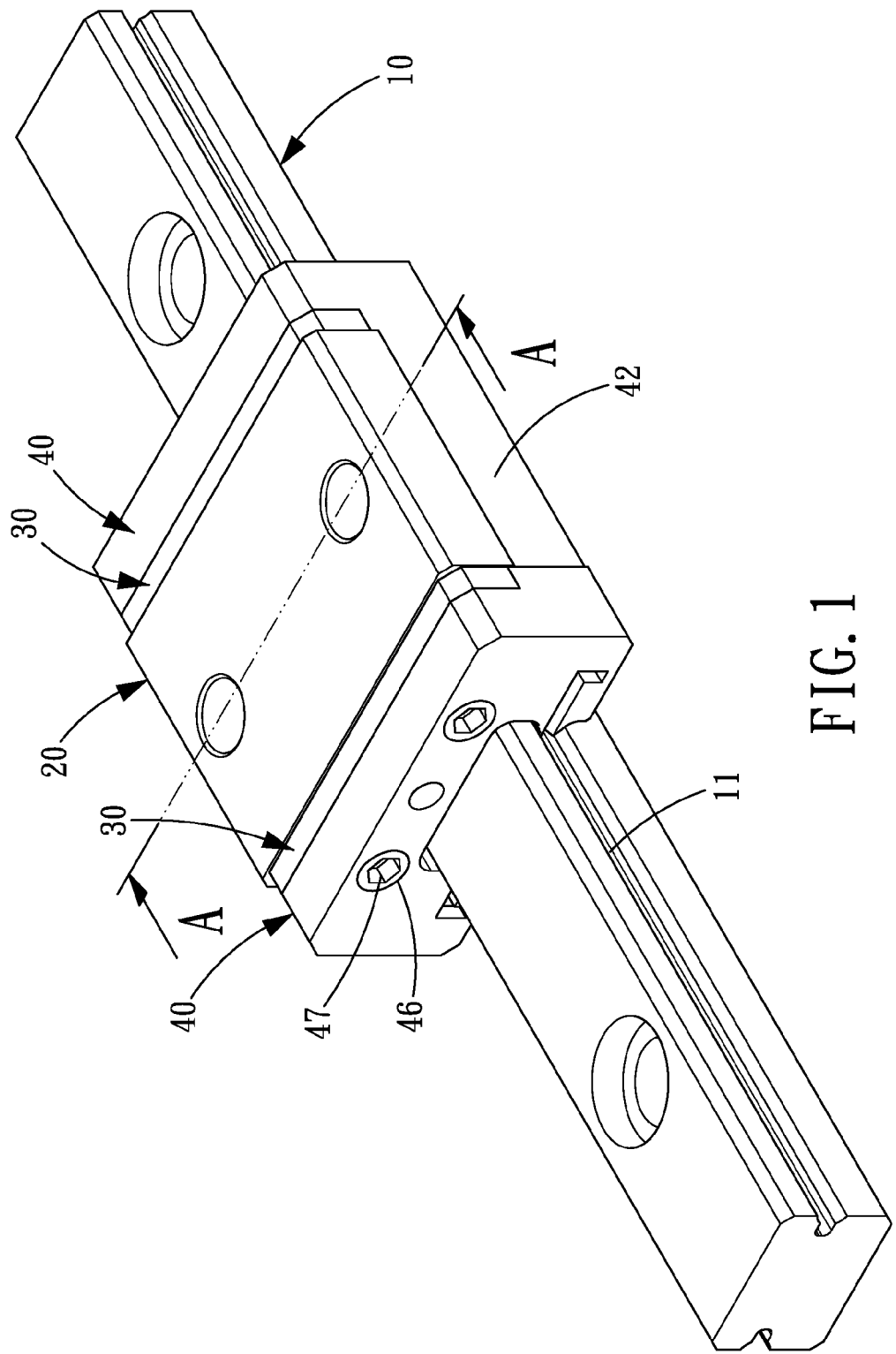
FIG. 1 is a perspective assembly view of a circulating system for a linear guideway in accordance with a first embodiment of the present invention.
Figure 2:
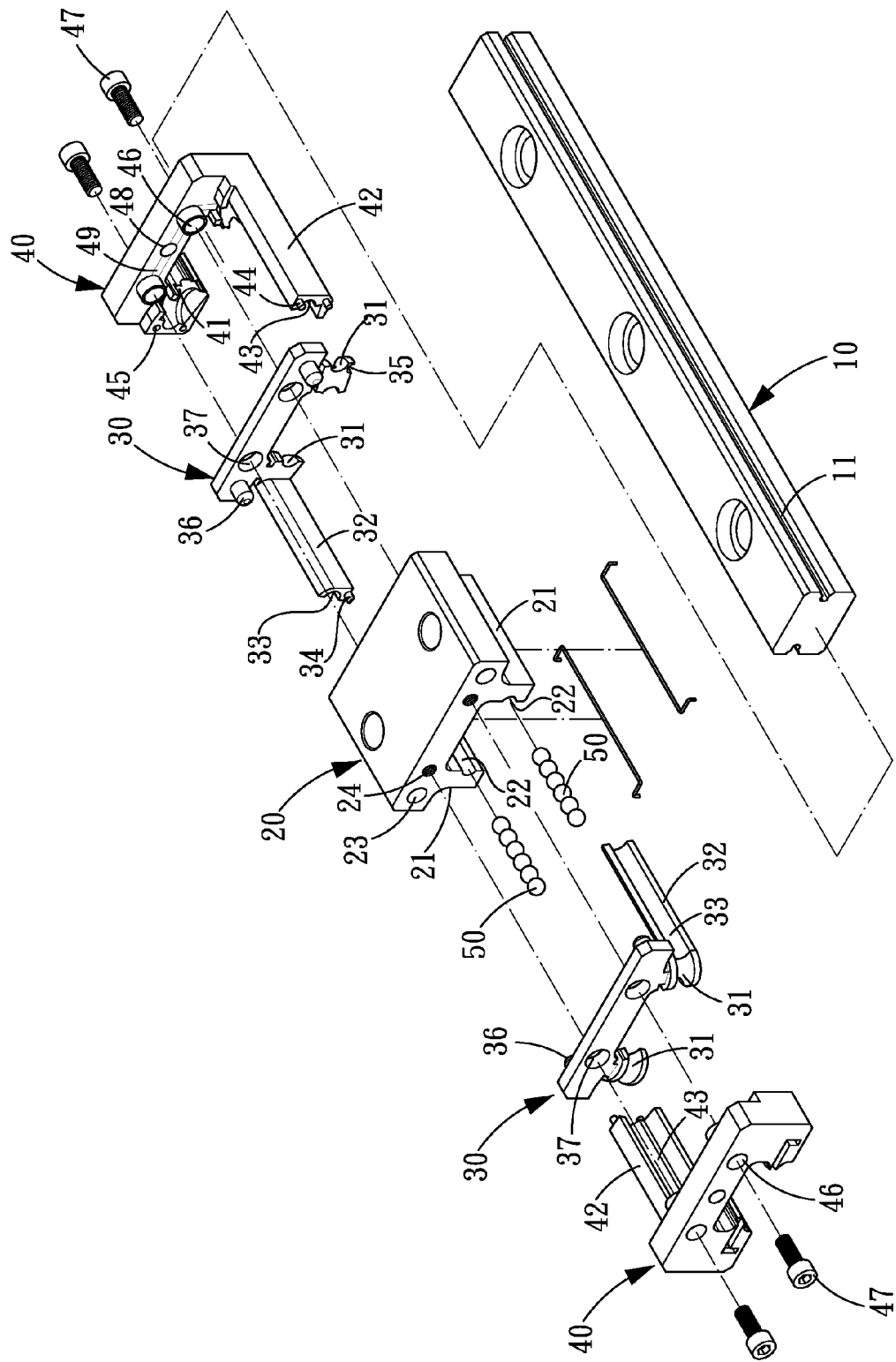
FIG. 2 is a perspective exploded view of the circulating system for a linear guideway in accordance with the first embodiment of the present invention.
Figure 3:
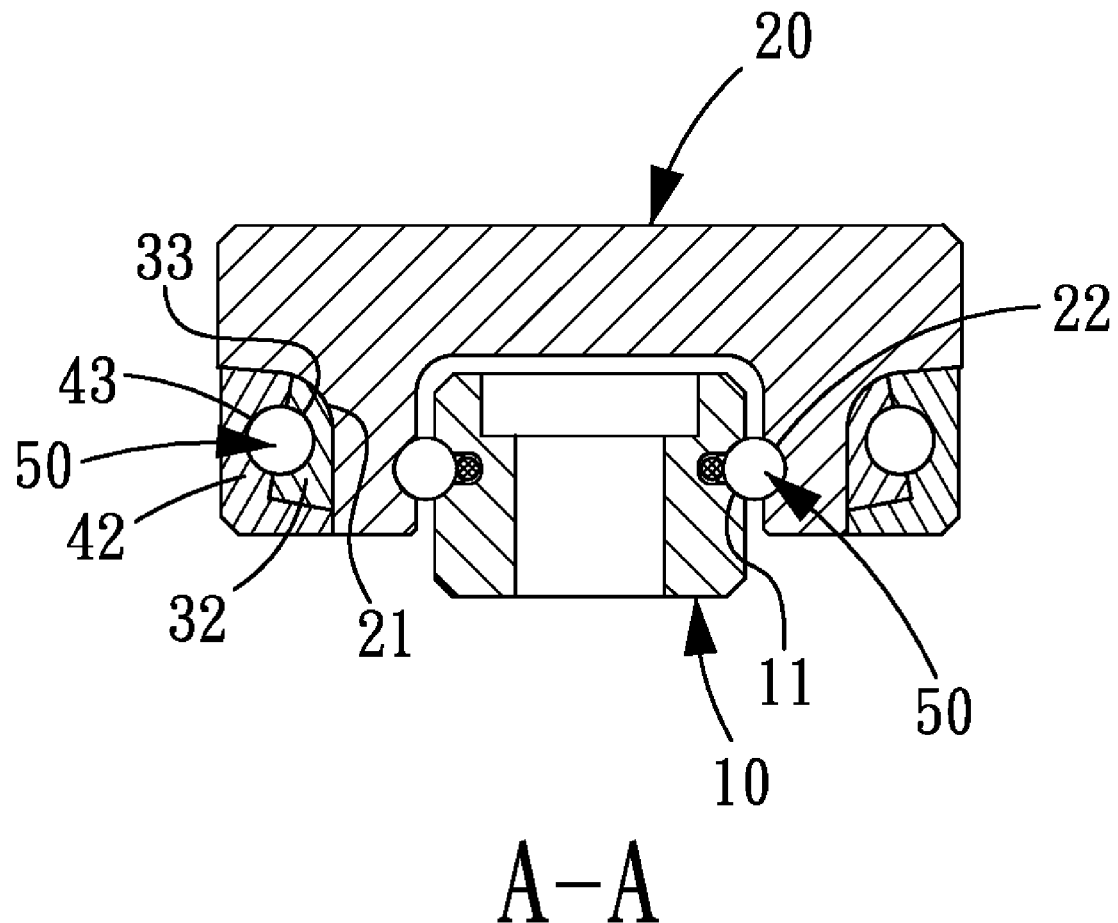
FIG. 3 is a cross-sectional view of the circulating system for a linear guideway in accordance with the first embodiment of the present invention along the line A-A of FIG. 1.
Figure 4:
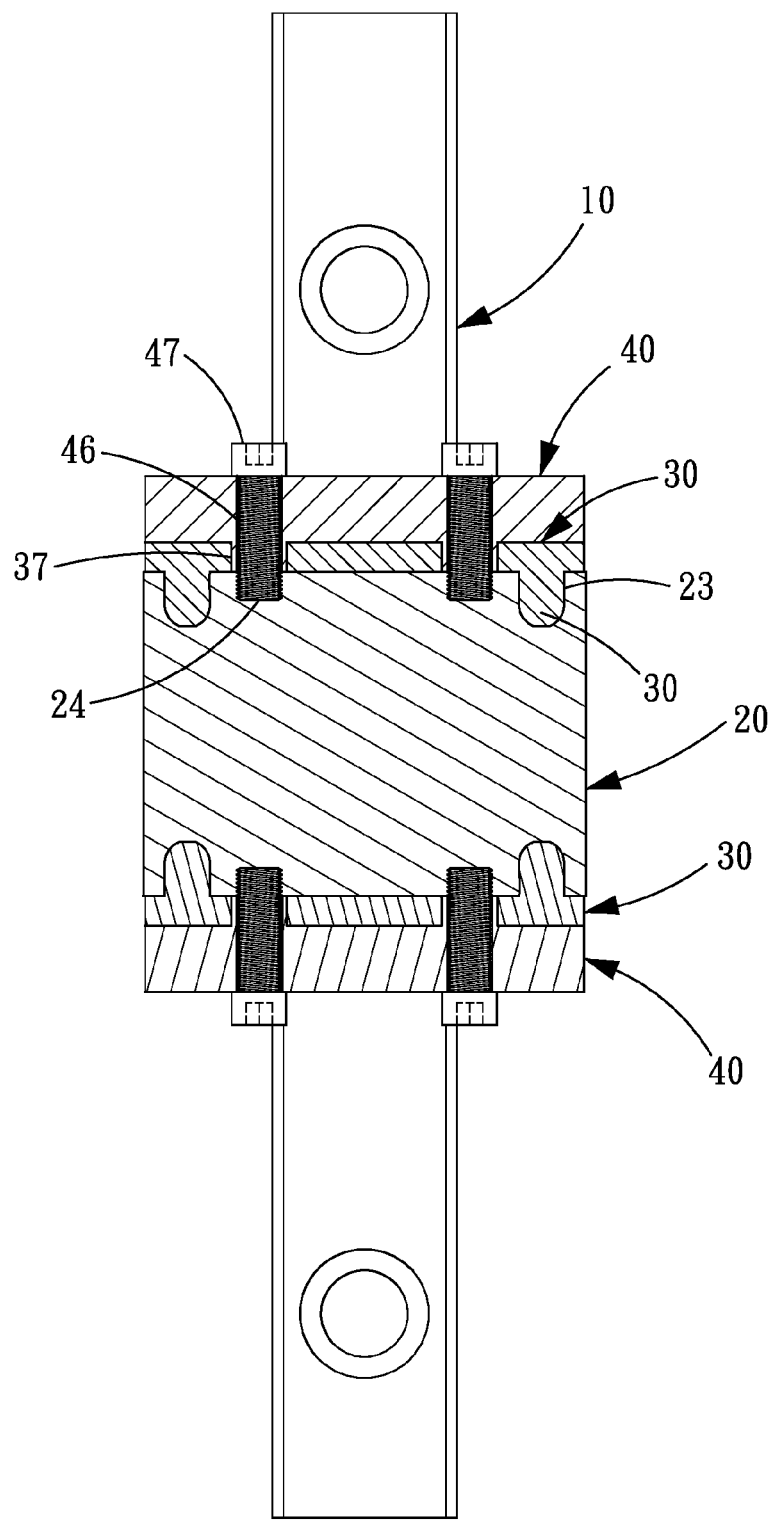
FIG. 4 is a top sectional view of the circulating system for a linear guideway in accordance with the first embodiment of the present invention.

The present invention will be clearer from the following description when viewed together with the accompanying drawings, which show, for purpose of illustrations only, the preferred embodiment in accordance with the present invention.

Referring to FIGS. 1-4, a circulating system for a linear guideway in accordance with a first embodiment of the present invention comprises a slide rail 10, a slide block 20, two cover plates 30, two end caps 40 and plural rolling elements 50.

The slide rail 10 is made of metal and defined with a rail groove 11 at each of two opposite sides thereof.

The slide block 20 is made of metal. The slide block 20 is provided with an assembling portion 21 at each of two opposite outer sides of a bottom thereof. The slide block 20 is slidably mounted on the slide rail 10. The slide block 20 is further defined with a block groove 22 at each of two opposite sides thereof, and the two block grooves 22 cooperate with the two rail grooves 11 of the slide rail 10, respectively to form two complete loaded paths. The slide block 20 is defined with plural limiting holes 23 and plural locking holes 24 in each of two opposite ends thereof.

The two cover plates 30 are made of soft plastic material and disposed at two opposite ends of the slide block 20. Each of the two cover plates 30 includes an inner end surface and an outer end surface. The two inner end surfaces of the two cover plates 30 abut against the two opposite ends of the slide block 20, respectively. Each of the two cover plates 30 is provided with a first return path 31 at each of two opposite sides of the outer end surface thereof and an inner return block 32 extending from the corresponding first return path 31 at one side thereof. The inner return blocks 32 of the two cover plates 30 are disposed in the respective assembling portions 21. Each of the inner return blocks 32 is defined with a half rolling path 33 connected to the corresponding first return path 31. The inner return block 32 of one of the cover plates 30 is combined to the corresponding first return path 31 of the other of the cover plates 30 by engaging plural protruding blocks 34 with plural grooves 35. The inner end surface of each of the cover plates 30 is further provided with plural limiting pins 36 in alignment with the limiting holes 23 of the slide block 20 and plural positioning holes 37 in alignment with the locking holes 24 of the slide block 20.

The two end caps 40 are made of hard plastic material and each include an inner end surface and an outer end surface. The two end caps 40 are disposed opposite each other in such a manner that the inner end surfaces of the two end caps 40 abut against the outer end surfaces of the two cover plates 30, respectively. The inner end surface of each of the end caps 40 is defined with a second return path 41 at each of two opposite sides thereof. The second return paths 41 of the end caps 40 cooperate with the first return paths 31 of the cover plates 30, respectively to form two complete return paths. Each of the end caps 40 is provided at one side thereof with an outer return block 42 extending from the corresponding second return paths 41 thereof, and the two outer return blocks 42 of the two end caps 40 are disposed in the assembling portions 21. Each of the outer return blocks 42 is defined with a half rolling path 43 connected to the corresponding second return path 41. The outer return block 42 of one of the end caps 40 is combined to the corresponding second return path 41 of the other of the end caps 40 by engaging plural protruding blocks 44 with plural grooves 45, at the same moment, the inner return blocks 32 are combined to the respective outer return blocks 42 in such a manner that the half rolling paths 33 of the cover plates 30 cooperate with the half rolling paths 43 of the end caps 40, respectively to form two complete rolling paths in the assembling portions 21. Both ends of the respective complete rolling paths and both ends of the respective complete loaded paths are connected to both ends of the respective complete return paths in such a manner one of the complete rolling paths, one of the complete loaded paths and the two complete return paths form a circulation path. The end caps 40 each are provided with plural through positioning cylinders 46 extending from the inner end surface thereof in alignment with the respective positioning holes 37 of the cover plates 30, and the positioning holes 37 are provided for insertion of the locking members 47, so that the locking members 47 can be locked to both ends of the slide block 20 after being inserted through the cover plates 30 and the end caps 40.

The plural rolling elements 50 are disposed in the respective circulation paths for circulating therein.

Figure 5:
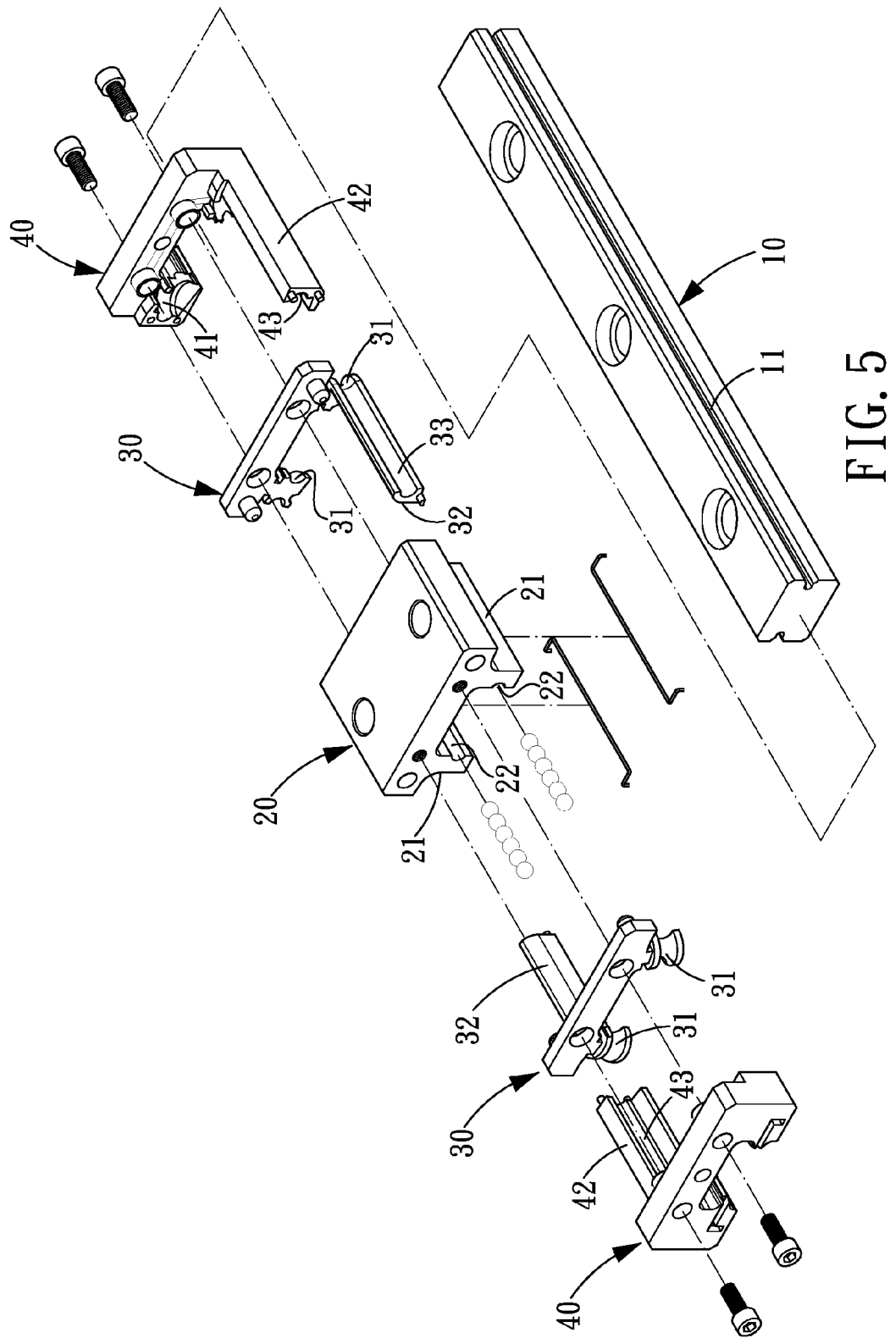
FIG. 5 is a perspective exploded view of a circulating system for a linear guideway in accordance with the present invention, showing that the inner return block and the outer return block of the cover plate and the end cap which are disposed at the same end of the slide block are located at the same side of the slide block.

The inner return block 32 and the outer return block 42 of the cover plate 30 and the end cap 40 which are disposed at the same end of the slide block 20 can be located at both sides of the slide block 20, as shown in FIGS. 1-4, or can also be located at the same side of the slide block 20, as shown in FIG. 5.

Figure 6:
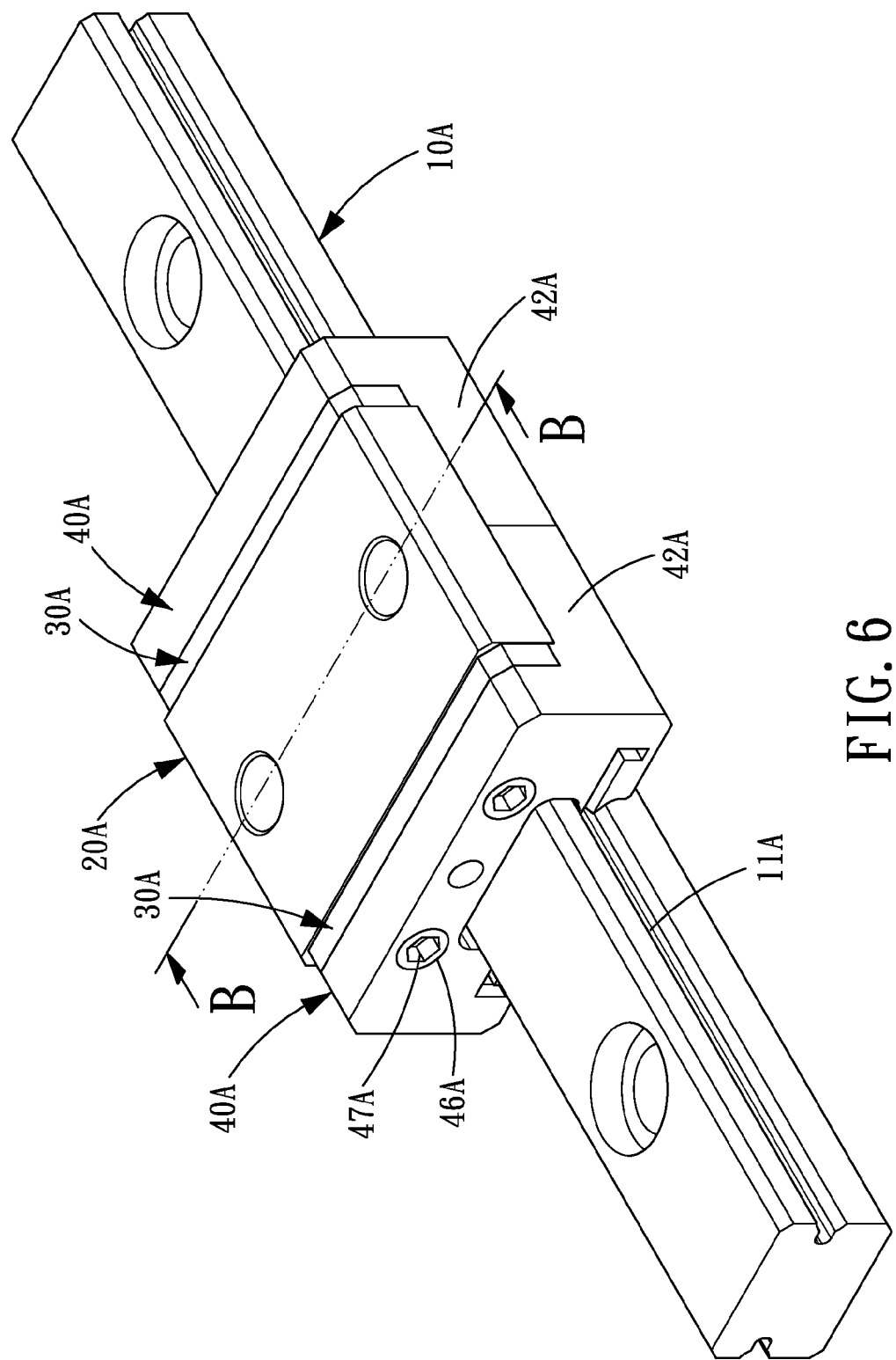
FIG. 6 is a perspective assembly view of a circulating system for a linear guideway in accordance with a second embodiment of the present invention.
Figure 7:
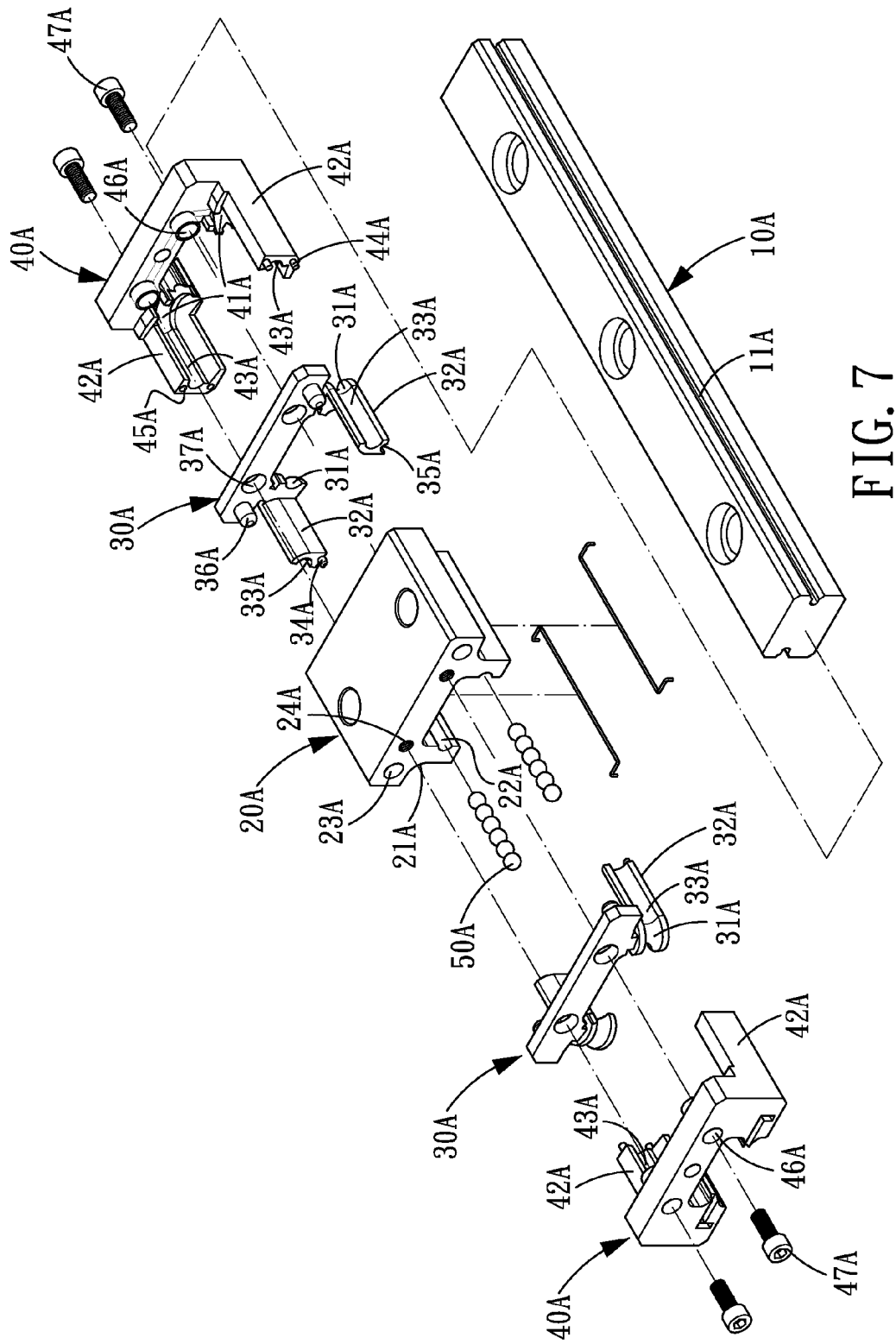
FIG. 7 is a perspective exploded view of the circulating system for a linear guideway in accordance with the second embodiment of the present invention.
Figure 8:
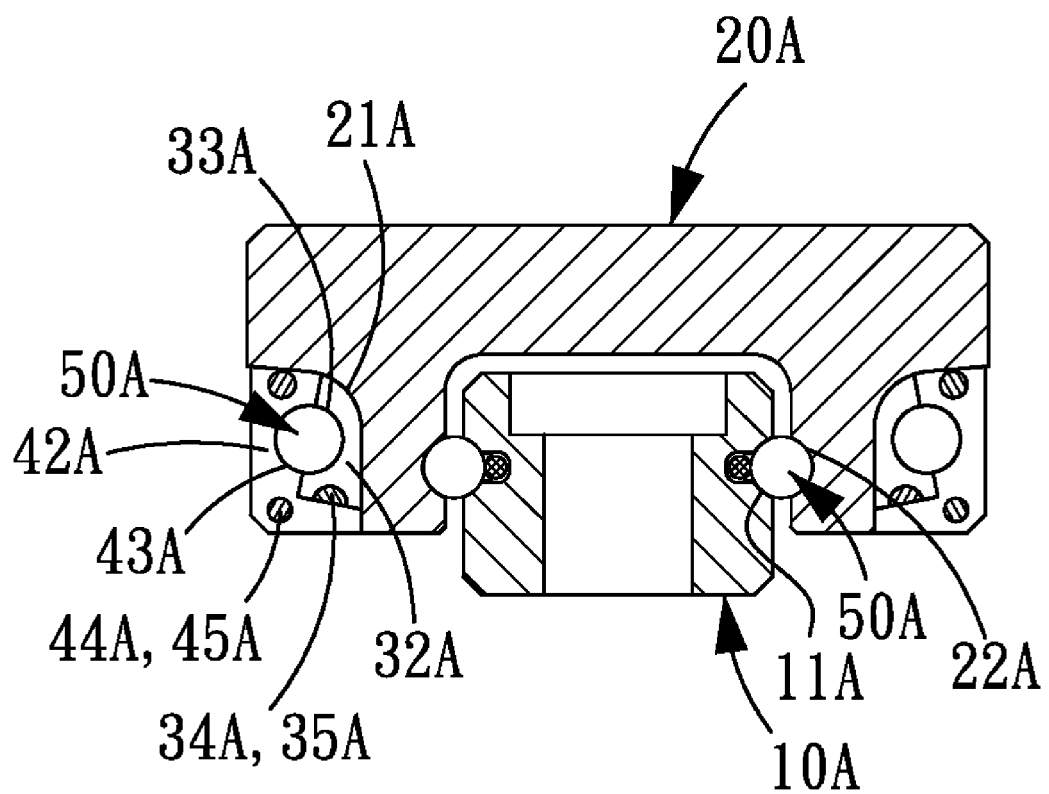
FIG. 8 is a cross-sectional view of the circulating system for a linear guideway in accordance with the second embodiment of the present invention along the line B-B of FIG. 6.

Referring to FIGS. 6-8, a circulating system for a linear guideway in accordance with a second embodiment of the present invention comprises a slide rail 10A, a slide block 20A, two cover plates 30A, two end caps 40A and plural rolling elements 50A.

The slide rail 10A is made of metal and defined with a rail groove 11A at each of two opposite sides thereof.

The slide block 20A is made of metal. The slide block 20A is provided with an assembling portion 21A at each of two opposite outer sides of a bottom thereof. The slide block 20A is slidably mounted on the slide rail 10A. The slide block 20A is further defined with a block groove 22A at each of two opposite sides thereof, and the two block grooves 22A cooperate with the two rail grooves 11A of the slide rail 10A, respectively to form two complete loaded paths. The slide block 20A is defined with plural limiting holes 23A and plural locking holes 24A in each of two opposite ends thereof.

The two cover plates 30A are made of soft plastic material and disposed at two opposite ends of the slide block 20A. Each of the two cover plates 30A includes an inner end surface and an outer end surface. The two inner end surfaces of the two cover plates 30A abut against the two opposite ends of the slide block 20A, respectively. Each of the two cover plates 30A is provided with a first return path 31A at each of two opposite sides of the outer end surface thereof and an inner return block 32A extending from each of the first return paths 31A thereof. The inner return blocks 32A are shorter than the assembling portions 21A and disposed in the assembling portions 21A. The two cover plates 30A are combined to each other by the inner return blocks 32A. A total length of two opposite combined inner return blocks 32A equals the length of the respective assembling portions 21A. Each of the inner return blocks 32A is defined with a half rolling path 33A connected to the corresponding first return path 31A. The inner return blocks 32A of one of the cover plates 30A are combined to the respective inner return blocks 32A of the other of the cover plates 30A by engaging plural protruding blocks 34A with plural grooves 35A. The inner end surface of each of the cover plates 30A is further provided with plural limiting pins 36A in alignment with the limiting holes 23A of the slide block 20A and plural positioning holes 37A in alignment with the locking holes 24A of the slide block 20A.

The two end caps 40A are made of hard plastic material and each include an inner end surface and an outer end surface. The two end caps 40A are disposed opposite each other in such a manner that the inner end surfaces of the two end caps 40A abut against the outer end surfaces of the two cover plates 30A, respectively. The inner end surface of each of the end caps 40A is defined with a second return path 41A at each of two opposite sides thereof. The second return paths 41A of the end caps 40A cooperate with the first return paths 31A of the cover plates 30A, respectively to form two complete return paths. Each of the two end caps 40A is further provided with two outer return blocks 42A extending from the corresponding two second return paths 41A thereof, and the two outer return blocks 42A of each of the two end caps 40A are shorter than the assembling portions 21A and disposed in the assembling portions 21A. The two end caps 40A are combined to each other by the outer return blocks 42A, and a total length of two opposite combined outer return blocks 42A equals the length of the respective assembling portions 21A. Each of the outer return blocks 42A is defined with a half rolling path 43A connected to the corresponding second return path 41A. The outer return blocks 42A of one of the end caps 40A are combined to the outer return blocks 42A of the other of the end caps 40A by engaging plural protruding blocks 44A with plural grooves 45A, at the same moment, the inner return blocks 32A are combined to the respective outer return blocks 42A in such a manner that the half rolling paths 33A of the cover plates 30A cooperate with the half rolling paths 43A of the end caps 40A, respectively to form two complete rolling paths in the assembling portions 21A. Both ends of the respective complete rolling paths and both ends of the respective complete loaded paths are connected to both ends of the respective complete return paths in such a manner one of the complete rolling paths, one of the complete loaded paths and the two complete return paths form a circulation path. The end caps 40A each are provided with plural through positioning cylinders 46A extending from the inner end surface thereof in alignment with the respective positioning holes 37A of the respective cover plates 30A, and the positioning holes 37A are provided for insertion of the locking members 47A, so that the locking members 47A can be locked to both ends of the slide block 20A after being inserted through the cover plates 30A and the end caps 40A.

The plural rolling elements 50A are disposed in the respective circulation paths for circulating therein.

In the present embodiment, the length of the respective inner return blocks 32A and the length of the respective outer return blocks 42A are both a half of the length of the respective assembling portions 21A.

Figure 9:
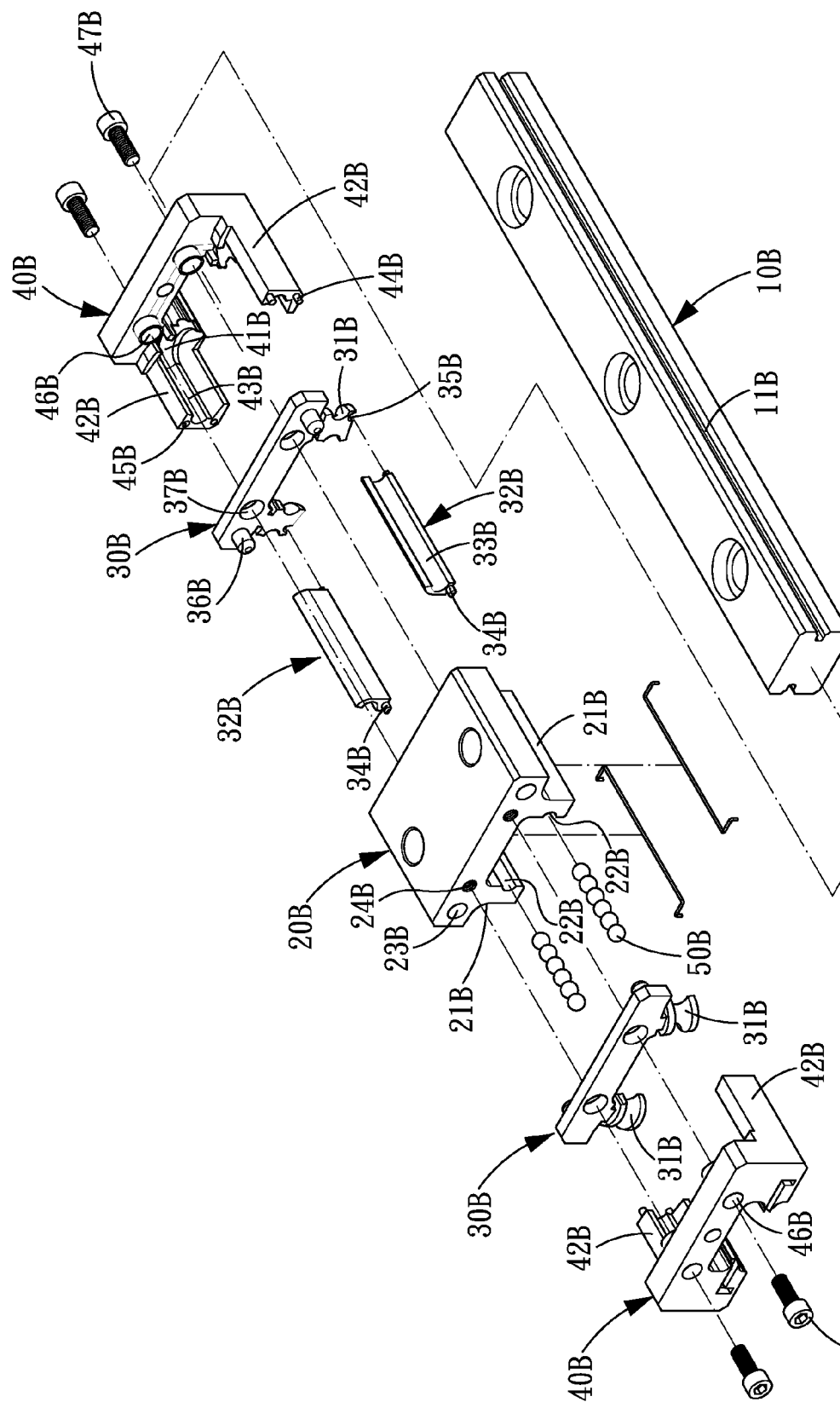
FIG. 9 is a perspective exploded view of a circulating system for a linear guideway in accordance with a third embodiment of the present invention.
Figure 10:
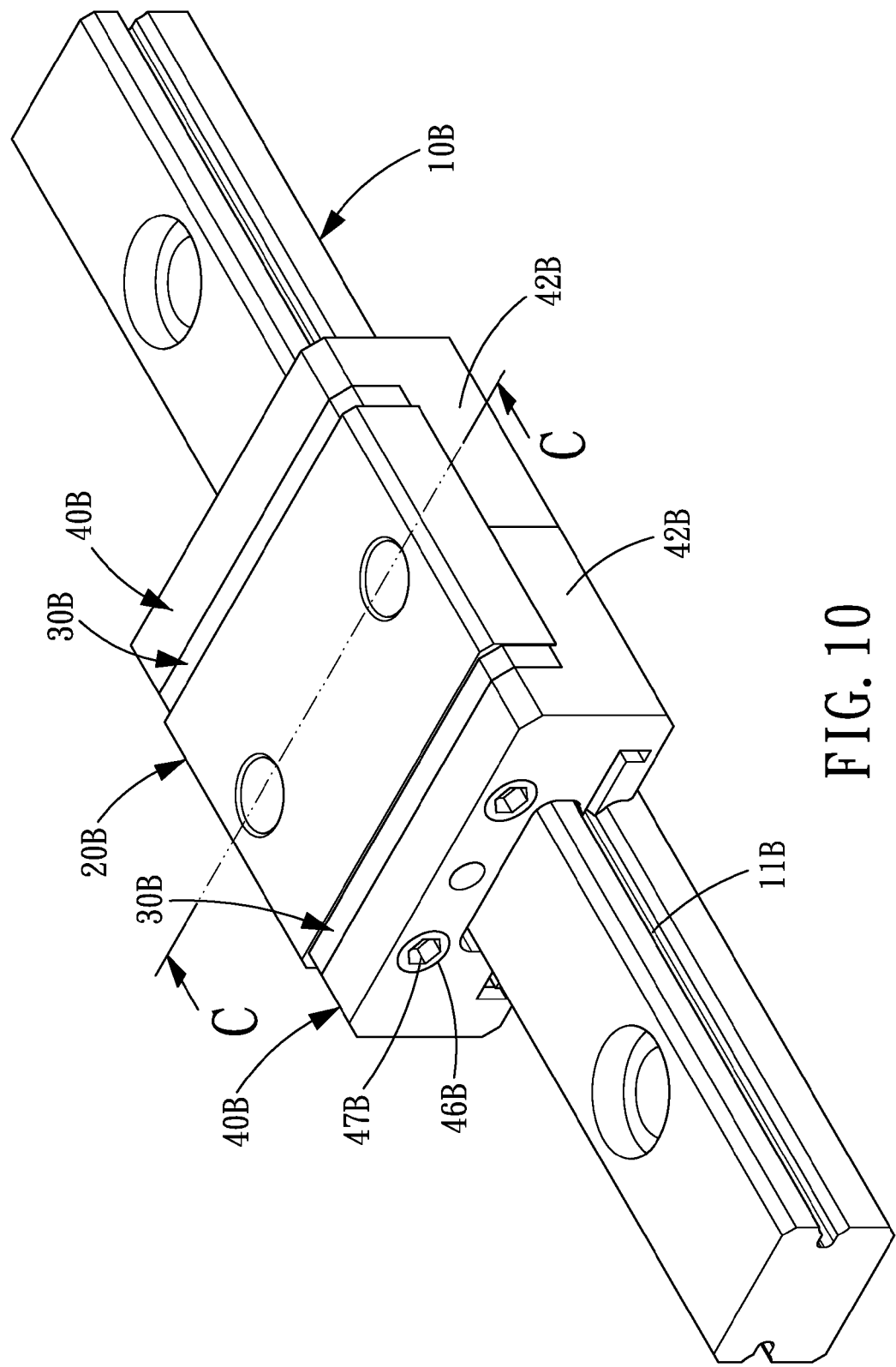
FIG. 10 is a perspective assembly view of the circulating system for a linear guideway in accordance with the third embodiment of the present invention.
Figure 11:
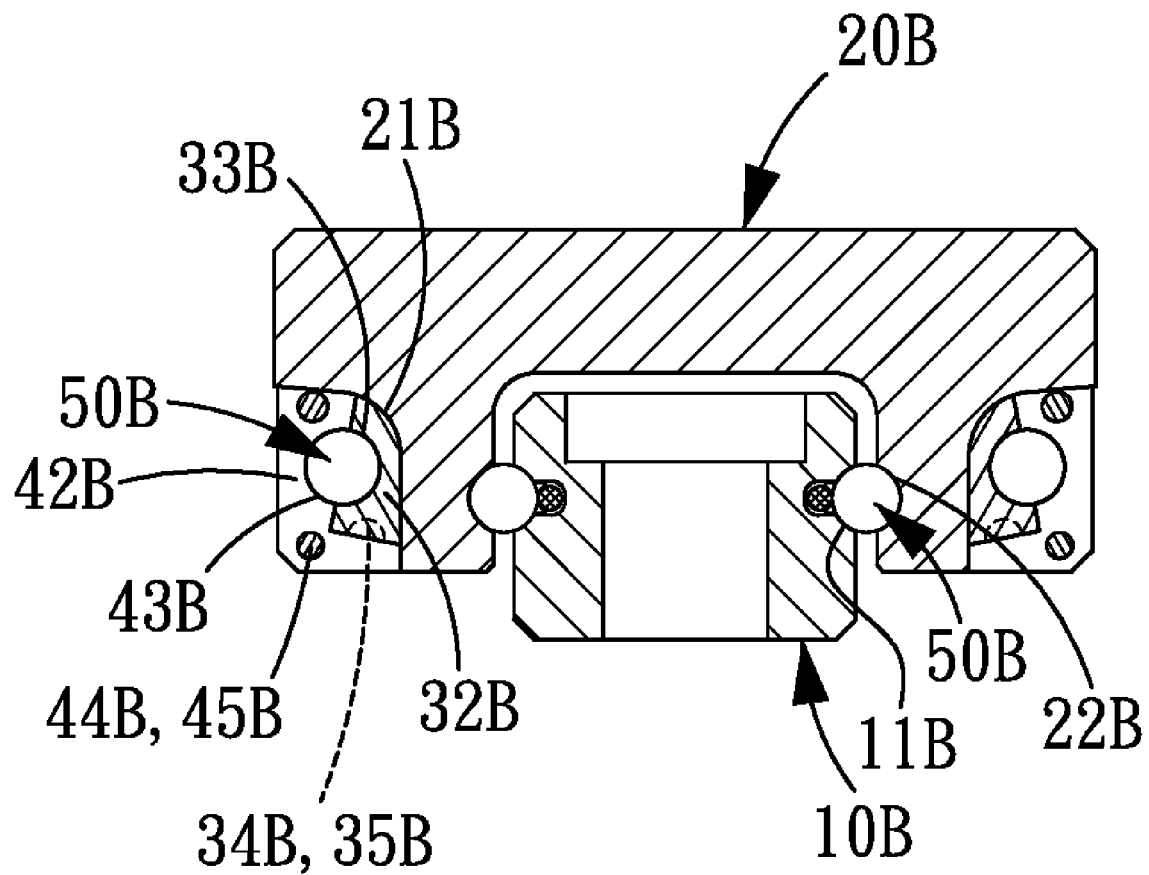
FIG. 11 is a cross-sectional view of the circulating system for a linear guideway in accordance with the third embodiment of the present invention along the line C-C of FIG. 10.

Referring to FIGS. 9-11, a circulating system for a linear guideway in accordance with a third embodiment of the present invention comprises a slide rail 10B, a slide block 20B, two cover plates 30B, two inner return blocks 32B, two end caps 40B and plural rolling elements 50B.

The slide rail 10B is made of metal and defined with a rail groove 11B at each of two opposite sides thereof.

The slide block 20B is made of metal. The slide block 20B is provided with an assembling portion 21B at each of two opposite outer sides of a bottom thereof. The slide block 20B is slidably mounted on the slide rail 10B. The slide block 20B is further defined with a block groove 22B at each of two opposite sides thereof, and the two block grooves 22B cooperate with the two rail grooves 11B of the slide rail 10B, respectively to form two complete loaded paths. The slide block 20B is defined with plural limiting holes 23B and plural locking holes 24B in each of two opposite ends thereof.

The two cover plates 30B are made of soft plastic material and disposed at two opposite ends of the slide block 20B. Each of the two cover plates 30B includes an inner end surface and an outer end surface. The two inner end surfaces of the two cover plates 30B abut against the two opposite ends of the slide block 20B, respectively. Each of the two cover plates 30B is provided with a first return path 31B at each of two opposite sides of the outer end surface thereof. The inner end surface of each of the cover plates 30B is further provided with plural limiting pins 36B in alignment with the limiting holes 23B of the slide block 20B and plural positioning holes 37B in alignment with the locking holes 24B of the slide block 20B.

The two inner return blocks 32B are independent elements made of hard plastic material and assembled to the outer sides of the first return paths 31B of the two cover plates 30, respectively. The two inner return blocks 32B are disposed in the assembling portions 21B, respectively. Each of the two inner return blocks 32B is defined with a half rolling path 33B connected to the corresponding first return paths 31B. The inner return blocks 32B are combined to the respective cover plates 30B by engaging plural protruding blocks 34B with plural grooves 35B.

The two end caps 40B are made of plastic material and each include an inner end surface and an outer end surface. The two end caps 40B are disposed opposite each other in such a manner that the inner end surfaces of the two end caps 40B abut against the outer end surfaces of the two cover plates 30B, respectively. The inner end surface of each of the end caps 40B is defined with a second return path 41B at each of two opposite sides thereof. The second return paths 41B of the end caps 40B cooperate with the first return paths 31B of the cover plates 30B, respectively to form two complete return paths. Each of the end caps 40B is provided with two outer return block 42B extending from the corresponding second return paths 41B thereof, and the two outer return blocks 42B of the respective end caps 40 are shorter than and disposed in the assembling portions 21B. A total length of two opposite combined outer return blocks 42B equals the length of the respective assembling portions 21B. Each of the outer return blocks 42B is defined with a half rolling path 43B connected to the corresponding second return path 41B. The outer return blocks 42B of one of the end caps 40 are combined to the outer return blocks 42B of the other of the end caps 40 by engaging plural protruding blocks 44B with plural grooves 45B, at the same moment, the inner return blocks 32B are combined to the respective outer return blocks 42B in such a manner that the half rolling paths 33B cooperate with the half rolling paths 43B, respectively to form two complete rolling paths in the assembling portions 21B. Both ends of the respective complete rolling paths and both ends of the respective complete loaded paths are connected to both ends of the respective complete return paths in such a manner one of the complete rolling paths, one of the complete loaded paths and the two complete return paths form a circulation path. The end caps 40B each are provided with plural through positioning cylinders 46B extending from the inner end surface thereof in alignment with the respective positioning holes 37B of the respective cover plates 30B, and the positioning holes 37B are provided for insertion of the locking members 47B, so that the locking members 47B can be locked to both ends of the slide block 20B after being inserted through the cover plates 30B and the end caps 40B.

The plural rolling elements 50B are disposed in the respective circulation paths for circulating therein.

Normally, the length of the respective outer return blocks 42B is a half of the length of the respective assembling portion 21B.

Figure 12:
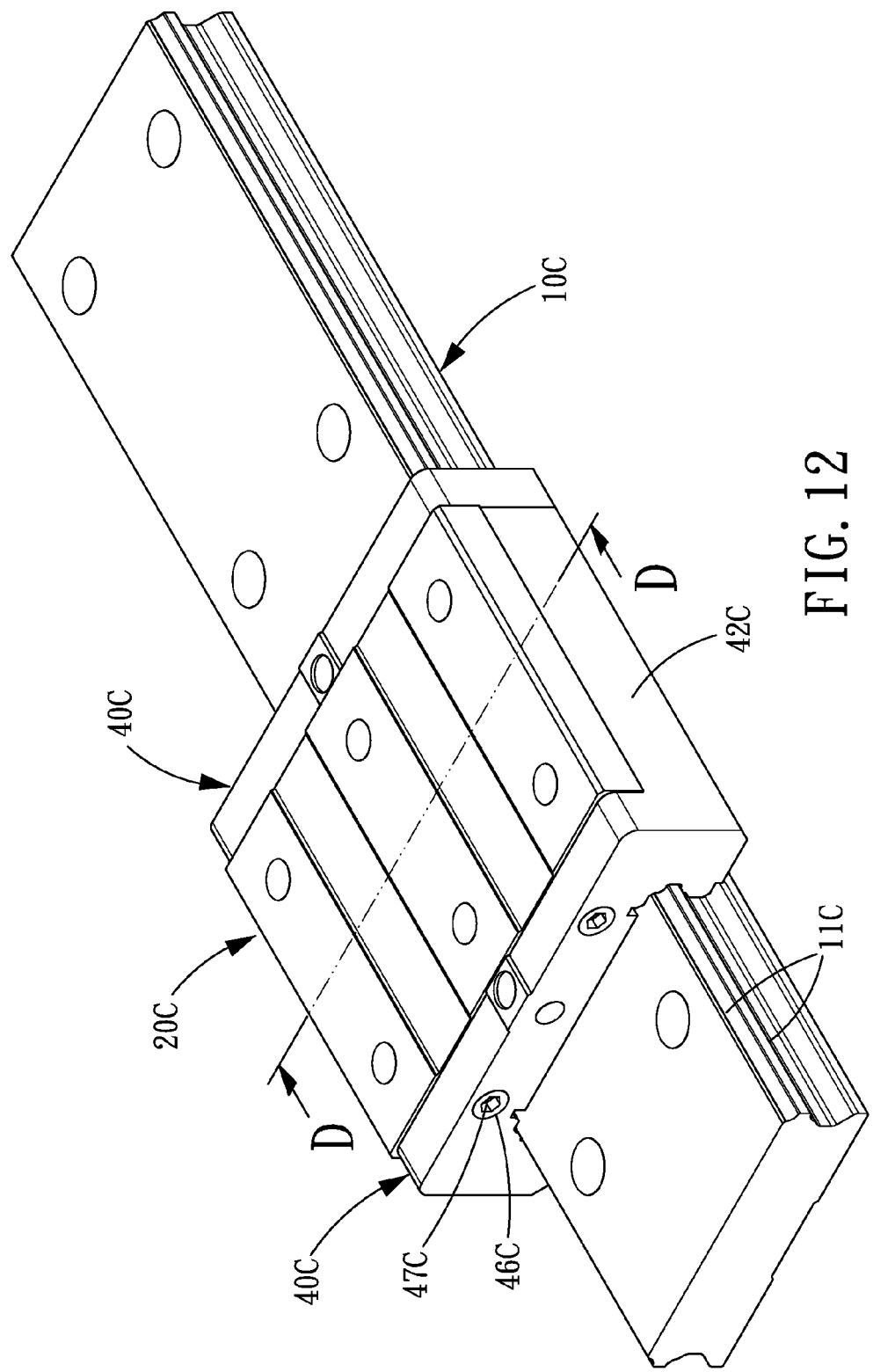
FIG. 12 is a perspective assembly view of a circulating system for a linear guideway in accordance with a four embodiment of the present invention having four circulation paths.
Figure 13:
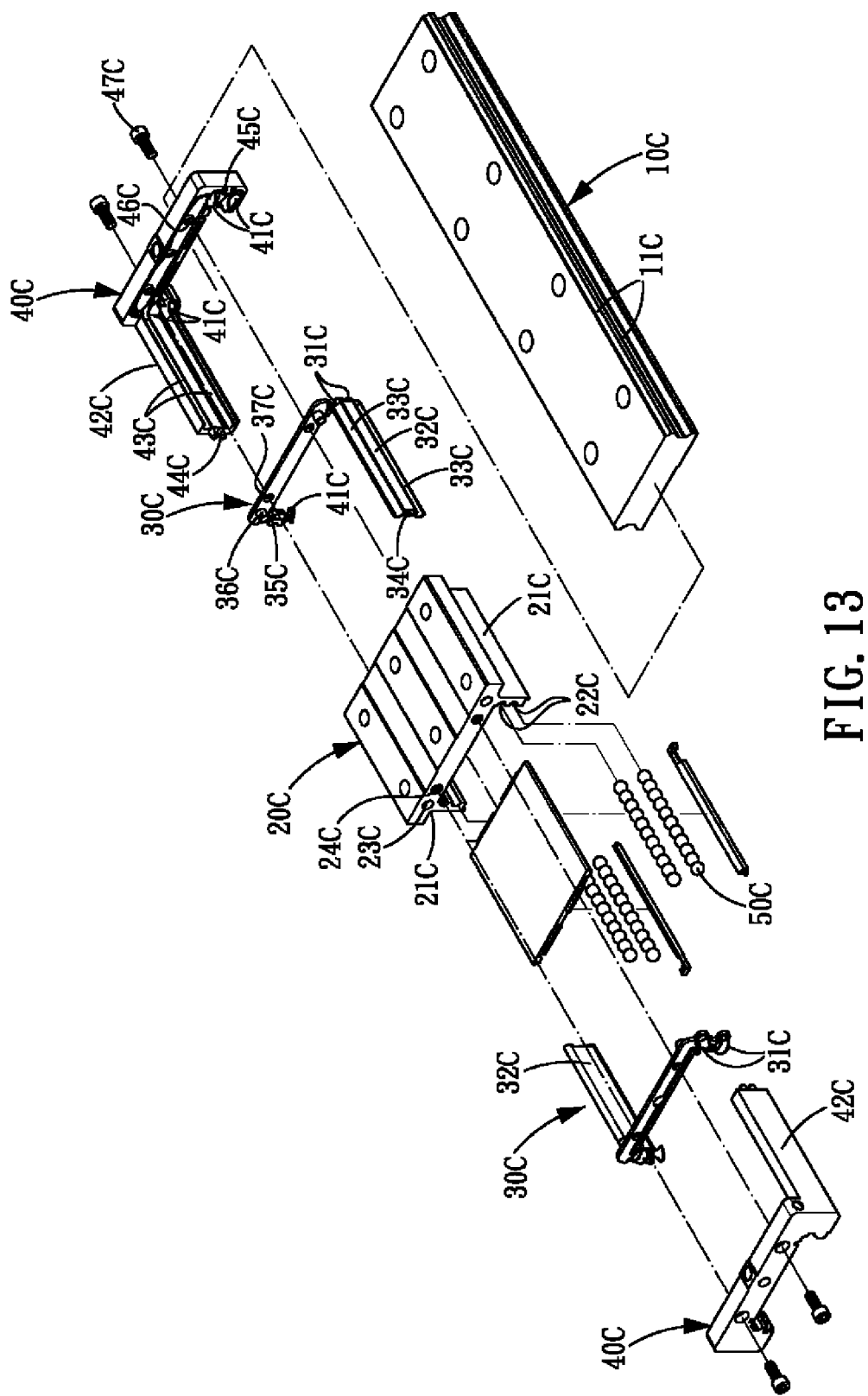
FIG. 13 is a perspective exploded view of the circulating system for a linear guideway in accordance with the four embodiment of the present invention.
Figure 14:
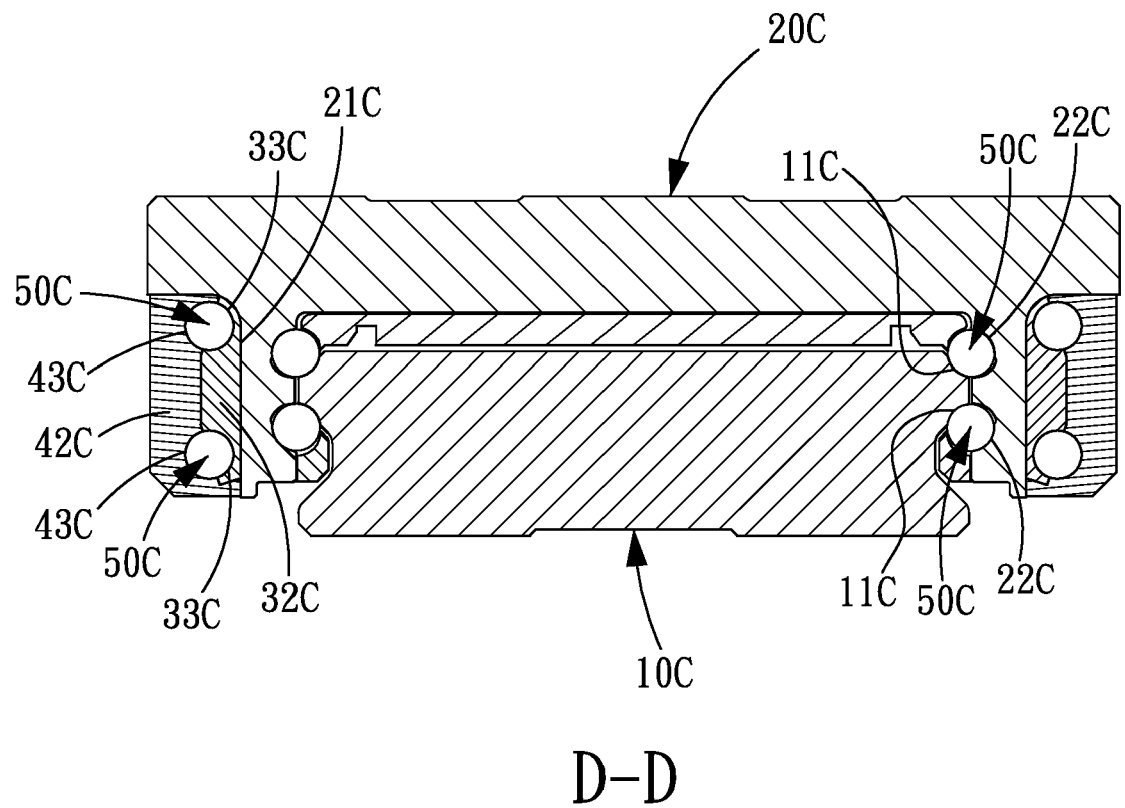
FIG. 14 is a cross-sectional view of the circulating system for a linear guideway in accordance with the four embodiment of the present invention along the line D-D of FIG. 12.
Figure 15:
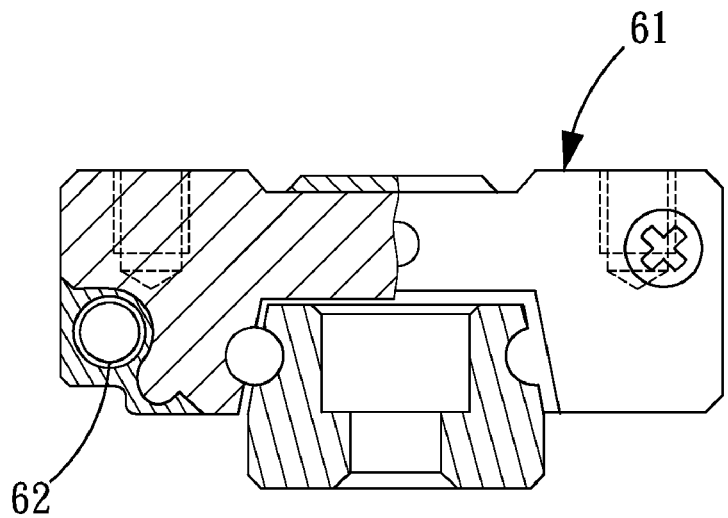
FIG. 15 is a partial cross-sectional view of a first conventional circulating system for a linear guideway.
Figure 16:
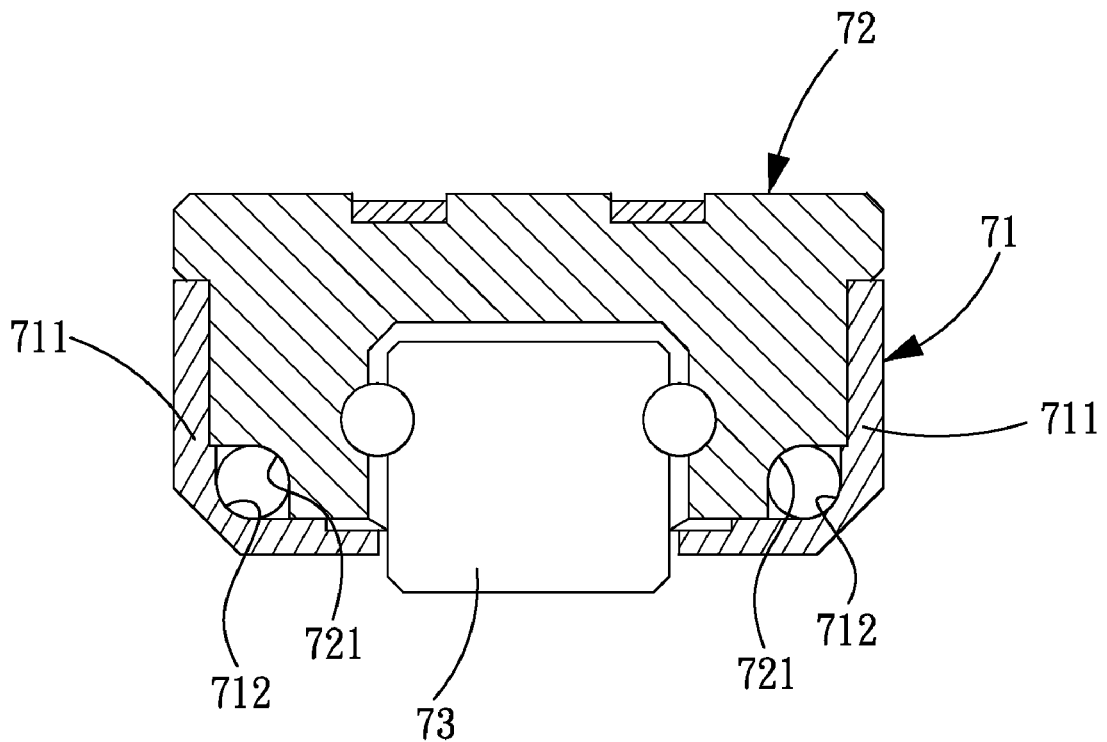
FIG. 16 is a cross-sectional of a second conventional circulating system for a linear guideway.
Figure 17:
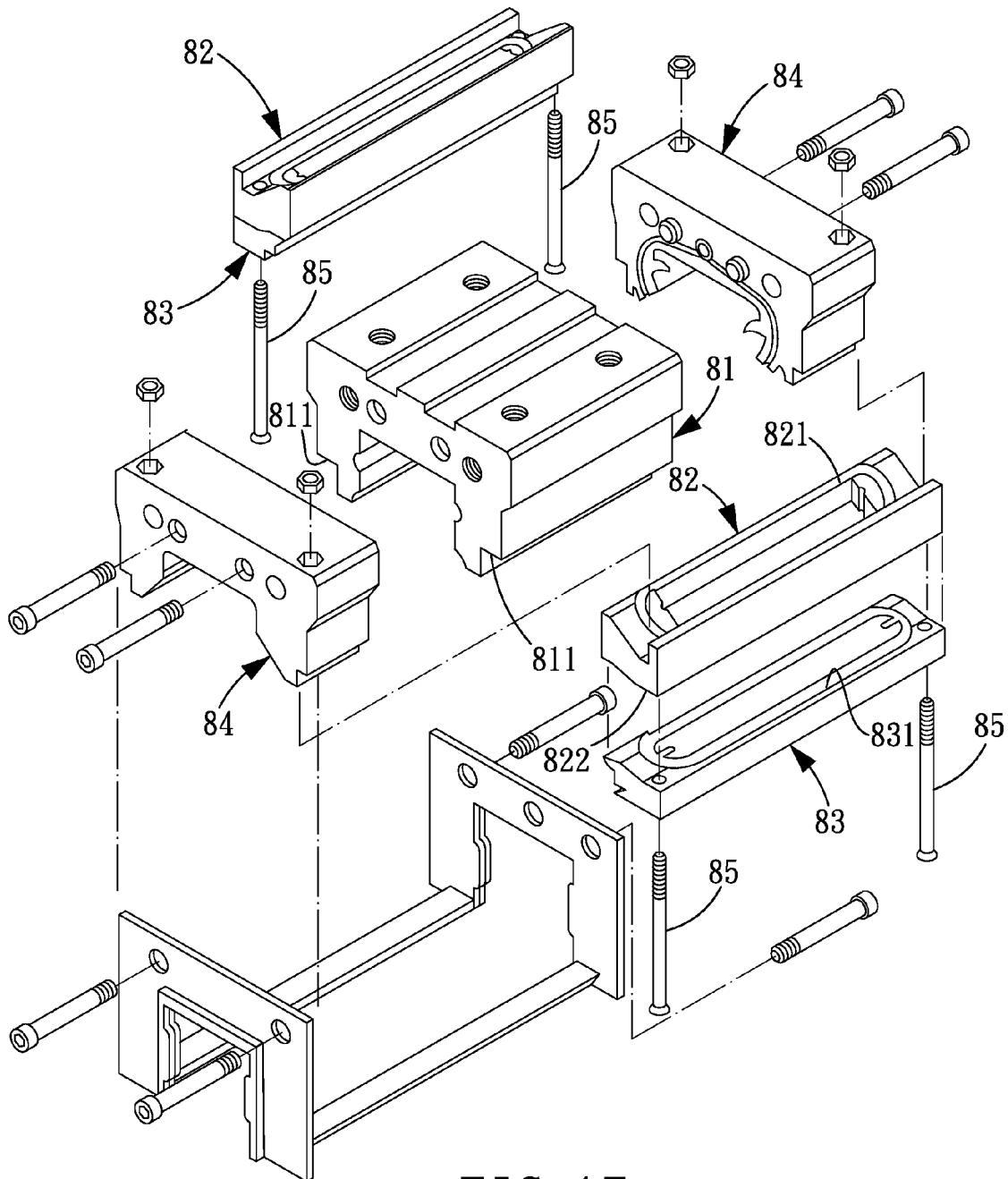
FIG. 17 is a cross-sectional of a third conventional circulating system for a linear guideway.

Referring to FIGS. 12-14, a circulating system for a linear guideway in accordance with a fourth embodiment of the present invention comprises a slide rail 10C, a slide block 20C, two cover plates 30C, two end caps 40C and plural rolling elements 50C.

The slide rail 10C is made of metal and defined with two rail grooves 11C at each of two opposite sides thereof.

The slide block 20C is made of metal. The slide block 20C is provided with an assembling portion 21C at each of two opposite outer sides of a bottom thereof. The slide block 20C is slidably mounted on the slide rail 10C. The slide block 20C is further defined with two block grooves 22 at each of two opposite sides thereof, and the block grooves 22C of the slide block 20C cooperate with the rail grooves 11C of the slide rail 10C, respectively to form four complete loaded paths. The slide block 20C is defined with plural limiting holes 23C and plural locking holes 24C in each of two opposite ends thereof.

The two cover plates 30C are made of soft plastic material and disposed at two opposite ends of the slide block 20C. Each of the two cover plates 30C includes an inner end surface and an outer inner surface. The two inner end surfaces of the two cover plates 30 abut against the two opposite ends of the slide block 20C, respectively. Each of the two cover plates 30C is provided with two first return paths 31C at each of two opposite sides of the outer end surface thereof and an inner return block 32C extending from the corresponding first return paths 31C at one side thereof. The inner return blocks 32C of the two cover plates 30C are disposed in the respective assembling portions 21C. Each of the inner return blocks 32C is defined with two half rolling paths 33C connected to the corresponding return paths 31C. The inner return block 32C of one of the cover plates 30 is combined to the corresponding first return paths 31C of the other of the cover plates 30 by engaging plural protruding blocks 34C with plural grooves 35C. The inner end surface of each of the cover plates 30C is provided with plural limiting pins 36C in alignment with the limiting holes 23C of the slide block 20C and plural positioning holes 37C in alignment with the locking holes 24C of the slide block 20C.

The two end caps 40C are made of hard plastic material and each include an inner end surface and an outer end surface.

The two end caps 40 are disposed opposite each other in such a manner that the inner end surfaces of the two end caps 40C abut against the outer end surfaces of the two cover plates 30C, respectively. The inner end surface of each of the end caps 40C is defined with two second return paths 41C at each of two opposite sides thereof. The second return paths 41C cooperate with the first return paths 31C of the cover plates 30C, respectively to form four complete return paths. Each of the end caps 40C is provided at one side thereof with an outer return block 42C extending from the corresponding second return paths 41C, and the two outer return blocks 42C of the two end caps 40 are disposed in the assembling portions 21C. Each of the outer return blocks 42C is defined with two half rolling paths 43C connected to the corresponding second return paths 41C. The outer return block 42C of one of the end caps 40C is combined to the corresponding second return paths 41C of the other of the end caps 40C by engaging plural protruding blocks 44C with plural grooves 45C, at the same moment, the inner return blocks 32C are combined to the respective outer return blocks 42C in such a manner that the half rolling paths 33C of the cover plates 30C cooperate with the half rolling paths 43C of the end caps 40C, respectively to form four complete rolling paths in the assembling portions 21C. Both ends of the respective complete rolling paths and both ends of the respective complete loaded paths are connected to both ends of the respective complete return paths in such a manner one of the complete rolling paths, one of the complete loaded paths and the two complete return paths form a circulation path. The end caps 40C each are provided with plural through positioning cylinders 46C extending from the inner end surface thereof in alignment with the respective positioning holes 37C of the respective cover plates 30C, and the positioning holes 37C are provided for insertion of the locking members 47C, so that the locking members 47C can be locked to both ends of the slide block 20C after being inserted through the cover plates 30C and the end caps 40C.

The plural rolling elements 50C are disposed in the respective circulation paths for circulating therein.

The end caps 40 (40A, 40B or 40C) in the above respective embodiments each are defined with an oil hole 48 to be combined to an oiler or an oil pipe for injection of lubrication oil. The end caps 40 (40A, 40B or 40C) each are further in the inner end surface thereof defined with an oil passage 79 extending from the oil hole 48 to the respective return paths to supply the lubrication oil from the oiler or the oil pipe to the respective rolling elements 50 (50A, 50B, or 50C) in the return paths through the oil hole 48, thus improving the lubrication between the rolling elements 50 (50A, 50B, or 50C) and the circulation paths, reducing friction coefficient, and extending the service life of the respective elements.

With the above structures, the present invention has the following advantages:

1. The cover plates 30 and the end caps 40 of the present invention are made by common plastic injection molding which can reduce machining cost and facilitate quick mass production;

2. The non-loaded rolling path of the circulation path for rolling elements 50 of the present invention is formed in such a method that the cover plates 30 and the end caps 40 are combined to make the half rolling paths 33, 43 of the inner return blocks 32 and the outer return blocks 42 between the cover plates 30 and the end caps 40 form the rolling paths, and since the rolling paths are made of plastic material, noise can be avoided when the rolling elements 50 roll along the rolling paths;

3. The rolling paths of the present invention are formed on the slide block by providing inner return blocks 32 on the cover plates 30 and providing outer return blocks 42 on the end caps 40 and then combining the inner return blocks 32 to the outer return blocks 42 but not by insert injection molding, so the slide block is not required to be machined to have a high accuracy to match the mold, thus greatly reducing the machining cost of the slide block.

While we have shown and described various embodiments in accordance with the present invention, it is clear to those skilled in the art that further embodiments may be made without departing from the scope of the present invention.

What is claimed is:

1. A circulating system for a linear guideway comprising:
 a slide rail being defined with at least one rail groove at each of two opposite sides thereof;
 a slide block being defined with an assembling portion at each of two opposite outer sides of a bottom thereof, the slide block being slidably mounted on the slide rail, the slide block being further defined with at least one block groove at each of two opposite sides thereof, the block grooves cooperating with the rail grooves to form plural complete loaded paths;
 two cover plates being disposed at two opposite ends of the slide block, each of the two cover plates including an inner end surface and an outer end surface, and the two inner end surfaces of the two cover plates respectively abutting against the two opposite ends of the slide block, each of the two cover plates being provided with at least one first return path at each of two opposite sides of the outer end surface thereof and provided with an inner return block extending from the corresponding first return path at one side thereof, the inner return blocks of the two cover plates being disposed in the assembling portions of the slide block, each of the inner return blocks being defined with at least one half rolling path connected to the corresponding first return path;
 two end caps each including an inner end surface and an outer end surface, the two end caps being disposed opposite each other in such a manner that the inner end surfaces of the end caps abut against the outer end surfaces of the cover plates, respectively, the inner end surface of each of the end caps being defined with at least one second return path at each of two opposite sides thereof, the second return paths of the end caps cooperating with the first return paths of the cover plates to form plural complete return paths, the two end caps being provided with outer return blocks extending from the second return paths, the outer return blocks being disposed in the assembling portions of the slide block, each of the outer return blocks being defined with a half rolling path connected to the corresponding second return path, the half rolling paths of the cover plates cooperating with the half rolling paths of the end caps to form plural complete rolling paths in the assembling portions of the slide block, both ends of the respective complete rolling paths and both ends of the respective complete loaded paths being connected to both ends of the respective complete return paths in such a manner that one of the complete rolling paths, one of the complete loaded paths and two complete return paths form a circulation path; and
 plural rolling elements being disposed in the respective circulation paths for circulating therein.

2. The circulating system for the linear guideway as claimed in claim 1, wherein each of the two cover plates is provided with the inner return block extending from the corresponding first return path at the one side thereof, the inner return block of one of the cover plates is combined to the corresponding return path of the other of the cover plates, each of the end caps is provided at one side thereof with one outer return block extending from the corresponding second return path thereof, the outer return block of one of the end caps is combined to the corresponding second return path of the other of the end caps.

3. The circulating system for the linear guideway as claimed in claim 2, wherein the slide block is defined with plural limiting holes and plural locking holes in each of two opposite ends thereof, the inner end surface of each of the cover plates is provided with plural limiting pins in alignment with the limiting holes of the slide block and plural positioning holes in alignment with the locking holes of the slide block, the end caps each are provided with plural through positioning cylinders extending from the inner end surface thereof in alignment with the respective positioning holes of the respective cover plates, and the positioning holes are provided for insertion of the locking members, so that the locking members are locked to both ends of the slide block after being inserted through the cover plates and the end caps.

4. The circulating system for the linear guideway as claimed in claim 2, wherein the slide rail is made of metal, the slide block is made of metal, the cover plates are made of plastic material, and the end caps are made of plastic material.

5. The circulating system for the linear guideway as claimed in claim 2, wherein the inner return block and the outer return block of the cover plate and the end cap which are disposed at the same end of the slide block are located at the same side of the slide block.

6. The circulating system for the linear guideway as claimed in claim 2, wherein the inner return block and the outer return block of the cover plate and the end cap which are disposed at the same end of the slide block are located at both sides of the slide block.

7. The circulating system for the linear guideway as claimed in claim 1, wherein the slide block is defined with plural limiting holes and plural locking holes in each of two opposite ends thereof, the inner end surface of each of the cover plates is provided with plural limiting pins in alignment with the limiting holes of the slide block and plural positioning holes in alignment with the locking holes of the slide block, the end caps each are provided with plural through positioning cylinders extending from the inner end surface thereof in alignment with the respective positioning holes of the respective cover plates, and the positioning holes are provided for insertion of the locking members, so that the locking members are locked to both ends of the slide block after being inserted through the cover plates and the end caps.

8. The circulating system for the linear guideway as claimed in claim 1, wherein the slide rail is made of metal, the slide block is made of metal, the cover plates are made of plastic material, and the end caps are made of plastic material.

9. The circulating system for the linear guideway as claimed in claim 1, wherein the inner return block and the outer return block of the cover plate and the end cap which are disposed at the same end of the slide block are located at the same side of the slide block.

10. The circulating system for the linear guideway as claimed in claim 1, wherein the inner return block and the outer return block of the cover plate and the end cap which are disposed at the same end of the slide block are located at both sides of the slide block.

11. The circulating system for the linear guideway as claimed in claim 1, wherein one of the cover plates is combined to the other of the cover plates by the engaging plural protruding blocks with the plural grooves, and one of the end caps is combined to the other of the end caps by engaging plural protruding blocks with plural grooves.

* * * * *